United States Patent
Case et al.

(10) Patent No.: US 8,161,252 B1
(45) Date of Patent: Apr. 17, 2012

(54) MEMORY INTERFACE WITH DYNAMIC SELECTION AMONG MIRRORED STORAGE LOCATIONS

(75) Inventors: Colyn S. Case, Hyde Park, VT (US); Anders M. Kugler, Sunnyvale, CA (US); Peter Tong, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1285 days.

(21) Appl. No.: 11/269,975

(22) Filed: Nov. 8, 2005

Related U.S. Application Data

(60) Provisional application No. 60/704,844, filed on Aug. 1, 2005.

(51) Int. Cl.
*G06F 13/00* (2006.01)

(52) U.S. Cl. ........ 711/161; 711/114; 711/147; 711/154; 711/156

(58) Field of Classification Search .................. 711/114, 711/147, 154, 156, 161
See application file for complete search history.

(56) References Cited

U.S. PATENT DOCUMENTS

| | | | | |
|---|---|---|---|---|
| 5,136,697 A | * | 8/1992 | Johnson | 712/239 |
| 5,655,097 A | * | 8/1997 | Witt et al. | 712/204 |
| 6,253,334 B1 | * | 6/2001 | Amdahl et al. | 714/4 |
| 6,314,525 B1 | * | 11/2001 | Mahalingham et al. | 714/4 |

* cited by examiner

*Primary Examiner* — Reba I. Elmore
(74) *Attorney, Agent, or Firm* — Kilpatrick Townsend & Stockton LLP

(57) ABSTRACT

Devices and methods provide data from multiple storage locations to a processor. A data block containing data required by a processor is stored in two or more locations, e.g., in a local memory and a system memory, both of which are accessible to the processor's memory interface. The memory interface directs each read request for mirrored data to one or another of the mirror locations. Selection of a mirror location to be read is based on substantially real-time information about which mirror location is best able to handle the request. For instance, the selection of a mirror location to access can be based at least in part on information about the level of activity on various buses that connect the processor to the mirror locations.

14 Claims, 7 Drawing Sheets

MEMORY INTERFACE WITH DYNAMIC SELECTION AMONG MIRRORED STORAGE LOCATIONS

CROSS-REFERENCE TO RELATED APPLICATION

This application claims the benefit of U.S. Provisional Application No. 60/704,844, filed Aug. 1, 2005, entitled "Memory Interface with Dynamic Selection among Mirrored Storage Locations," which disclosure is incorporated herein by reference for all purposes.

BACKGROUND OF THE INVENTION

The present invention relates in general to memory interface devices and in particular to a memory interface that dynamically selects among mirrored storage locations when stored data is being accessed.

Computer-based techniques for rendering and displaying animated images are known in the art. Typically, a three-dimensional (3-D) rendering process begins by modeling each object in the scene using vertices that define primitives (lines, triangles, and other simple shapes) corresponding approximately to the 3-D shape of the object. Each vertex has various attributes (color, surface normal, texture, etc.) representing the appearance of that portion of the object. Computations are performed to model the interaction of light with the objects. A viewpoint and view direction within the scene are specified, and coordinates of the various primitives in the scene are transformed into viewing coordinates and projected onto a viewing plane to determine which objects are visible at each of an array of pixels. Each pixel is shaded based on the object or objects visible at that location. The color value for each pixel is delivered to a display device, and the image appears. To achieve smooth animation, new images must be rendered and displayed at a rate of about 30 frames per second (or in some instances even faster).

Rendering realistic images at this rate requires substantial processing power. Typically, the processing power is supplied by a dedicated graphics processor that has a number of parallel processing cores optimized for performing the computations associated with rendering. Modern graphics processors are powerful enough to operate on hundreds of millions of vertices per second.

To operate at such rates, a graphics processor must be able to receive and store massive amounts of data at suitably high rates. In the course of rendering, the graphics processor requires access to vertex data describing objects to be rendered (including their attributes) and also to various data surfaces (i.e., data blocks that stores a value of some quantity corresponding to each location in some coordinate space, such as textures, pixel buffers, depth buffers, stencil buffers, etc.) and to other data such as command sequences that control operations of the graphics processor. Typical rendering applications require many megabytes of data; for instance, just to store a pixel buffer of 1024×768 pixels using 32-bit color requires 6 megabytes (MB). Textures can be as large or even larger. These large quantities of data are generally stored in memory accessible to the graphics processor, such as dedicated graphics memory accessible via a "local" bus and/or main system memory, which is accessible to the graphics processor via a "system" bus. To render images at animation speed, data needs to be moved quickly between the processor and memory. Accordingly, graphics processors are designed to support very high input/output (I/O) rates, e.g., in excess of 30 gigabytes per second (GB/s).

In some systems, to optimize cost versus performance, it is desirable to exploit a combination of local and system memory to obtain acceptable performance. In one such configuration, the local graphics bus provides a throughput of about 5.8 GB/s, and a high-speed system bus such as Peripheral Component Interconnect (PCI) Express referred to herein as "PCI-E," provides up to about 3 GB/s for memory read operations and about 2.3 GB/s for memory write operations. Thus, the performance of modern graphics processing systems is usually limited by bus bandwidth rather than internal processing power.

To increase available bandwidth, some graphics subsystems use both local and system memory for data storage. By storing some data in local graphics memory while other data is stored in system memory, the combined bandwidth of both local and system buses (about 10 GB/s in one implementation) can be exploited. For example, suppose that in a system with the bus configuration described above, a graphics processor requires a color buffer, a depth buffer and a texture surface. Suppose further that to achieve a desired level of performance, the color buffer and the depth buffer each need to deliver data at 3 GB/s and the texture surface needs to deliver data at 4.5 GB/s. If the color and depth buffers are stored in local memory while the texture surface (which is read but not written by the graphics processor) is stored in system memory, then 4.5 GB/s of read data would be requested on the system bus while only 3 GB/s could be supplied. Thus, the system bus would deliver texture data at only about 67% of the desired rate, compromising performance. If, instead, the color and texture surfaces are stored in local memory while the depth buffer is stored in system memory, then the local bus would be overloaded, delivering data at about 77% of the desired rate and again compromising performance.

Another option is to split one or more of the surfaces between local and system memories. For instance, in the example above, with the color buffer in local memory and the depth buffer in system memory, the texture surface could be split, with two thirds of the texture data in local memory and the other third in system memory. Then, on average the local bus would be asked to carry 6 GB/s and would be just slightly overloaded, while the system bus would not be overloaded at all.

In practice, however, there are considerable fluctuations in the graphics processor's demand for data from one frame to the next and at different times during the rendering of each frame. For instance, different frames might require data from different parts of a texture surface, or different pixels within the frame might be mapped to different numbers of textures. Thus, even where the average bandwidth demand can be met, fluctuations can still saturate one or the other (or both) of the buses, causing delay in the rendering process, which stalls while waiting for needed data.

It would therefore be desirable to provide improved techniques for making efficient use of the available bus bandwidth under changing conditions.

BRIEF SUMMARY OF THE INVENTION

Embodiments of the present invention provide systems and methods for mirroring blocks of data to multiple storage locations and dynamically selecting, in response to a specific read request, one of the mirrored copies as a source location from which to read data. A data block (such as a texture or other surface, vertex list, command sequence, or the like) is stored in two or more locations, e.g., in a local memory and a system memory, which can be connected to a processor by different buses. The processor directs each read operation for mirrored data to one or another of the mirror locations. The location can be selected based on substantially real-time information about which bus or mirror location is best able to handle the request. For instance, in some embodiments, the selection of a mirror location to access is based at least in part on information about the level of activity on one or more of the buses via which the data is accessible.

According to one aspect of the present invention, a method of reading data in a memory interface unit of a processor is provided, where a copy of the data is stored in each of a number of mirror locations, each of which is communicably coupled to the processor. An instruction to read the data is received. In response to receiving the instruction, a source location to be used for reading the data is selected, the source location being one of the mirror locations. The data is requested from the source location.

In some embodiments, a first one of the plurality of mirror locations is in a first memory device. A first level of activity for the first memory device is determined, and the source location is selected based at least in part on the first level of activity. For example, the first level of activity can be compared to a threshold, with the first mirror location being selected as the source location in the event that the first level of activity is below the threshold and a mirror location other than the first mirror location being selected as the source location in the event that the first level of activity is above the threshold.

Various techniques can be used to determine the level of activity. For instance, if the first memory device is coupled to the memory interface unit by a first bus, the act of determining the first level of activity may include determining an amount of data requested via the first bus during a time interval. Alternatively, the act of determining the first level of activity may include determining a number of pending requests for the first memory device, where each "pending" request is a request that has been transmitted to the first memory device by the memory interface unit and for which the memory interface unit has not received a response from the first memory device. In still other embodiments, the act of determining the first level of activity may include determining an average latency for receiving a response from the first memory device to a request transmitted by the memory interface unit.

In some embodiments, a first one of the mirror locations is in a first memory device and a second one of the mirror locations is in a second memory device. A first level of activity for the first memory device and a second level of activity for the second memory device are each determined, and the source location is selected based at least in part on comparing the first level of activity and the second level of activity. For instance, the first mirror location might be selected as the source location in the event that the first level of activity is lower than the second level of activity while the second mirror location is selected as the source location in the event that the second level of activity is lower than the first level of activity.

According to another aspect of the invention, a memory interface unit for accessing data, where at least some of the data is mirrored at two or more mirror locations, includes a client interface section, a steering section and a bus interface section. The client interface section is configured to receive an instruction to read data. The steering section configured to determine, in response to the instruction, whether the data to be read is mirrored and, in the event that the data to be read is mirrored, to select one of the mirror locations at which the data is mirrored as a source location to be used for reading the data. The bus interface section configured to send a request for the data to the source location. In some embodiments, the steering section is advantageously configured such that selection of the source location is based at least in part on an activity level associated with one of the mirror locations.

In some embodiments where a first one of the mirror locations is in a first memory device and a second one of the mirror locations is in a second memory device, the bus interface section includes a first bus interface unit configured to communicate with the first memory device via a first bus and a second bus interface unit configured to communicate with the second memory device via a second bus. The first bus might be a local or dedicated bus, and the second bus might be a system or shared bus.

The steering section can include a meter circuit configured to measure a level of activity on the first bus and a control circuit configured to select one of the first mirror location and the second mirror location as the source location, based on the measured level of activity. In some embodiments, the control circuit includes a comparison circuit configured to compare the measured level of activity to a threshold and is configured to select the first mirror location as the source location in the event that the measured level of activity is below the threshold and to select the second mirror location as the source location in the event that the measured level of activity is above the threshold.

Various meter circuits can be employed. In one embodiment, the meter circuit includes a counter configured to count, during an interval consisting of a number $N_{SR}$ of clock cycles, a number C of the clock cycles occupied by the data associated with each request sent on the first bus. For instance, the meter circuit can include a shift register with a number $N_{SR}$ of nodes (including an input node and an output node) and a serializer coupled to the input node of the shift register. The serializer is advantageously configured to load a logic high value into the shift register corresponding to each clock cycle occupied by the data associated with each request sent on the first bus and to load a logic low value into the shift register corresponding to each clock cycle not occupied by the data associated with each request sent on the first bus. The serializer is further configured to increment the counter each time a logic high value is loaded into the shift register, and the shift register is configured to decrement the counter each time a logic high value arrives at the output node of the shift register.

In another embodiment, the meter circuit includes a counter configured to count a number of pending requests, wherein each pending request is a request that has been transmitted by the first bus interface unit and for which the first bus interface unit has not received a response from the first memory device.

In still other embodiments, the steering section of the memory interface unit can include a first meter circuit configured to measure a first level of activity on the first bus, a second meter circuit configured to measure a second level of activity on the second bus, and a control circuit configured to select one of the first mirror location and the second mirror location as the data source based on comparing the first and second levels of activity.

According to still another aspect of the present invention, a processor includes one or more processing cores and a memory interface unit. The processing cores are configured to generate requests to read data. The memory interface unit, which is configured to receive the requests to read data from the one or more processing cores and to provide requested data to the one or more processing cores, includes a client interface section, a steering section, and a bus interface section. The client interface section is configured to receive a request to read data. The steering section configured to determine, in response to the request, whether the data to be read is mirrored at two or more mirror locations and, in the event that the data to be read is mirrored, to select one of the mirror locations at which the data is mirrored as a source location to be used for reading the data. The bus interface section is configured to send a request for the data to the source location.

According to a further aspect of the present invention, a method of controlling a processor (such as a graphics processor) that executes instructions is provided. A first data block is stored in each of two or more mirror locations, where each of the mirror locations is communicably coupled to the processor. A descriptor of the first data block is created, the descriptor including a status indicator that indicates that the first data block is mirrored. A first instruction is sent to the processor to read the stored data for at least a portion of the first data block; during execution of the first instruction, the processor accesses the descriptor of the first data block to determine that the first data block is mirrored and selects one of the mirror locations at which the first data block is stored as a source location from which to read the data. The selection of the source location can be based at least in part on an activity level associated with one of the mirror locations.

In some embodiments, the status indicator identifies each mirror location in which the data block is stored. The data block can be stored in each location in the same address arrangement (i.e., such that in each mirror location, locations at the same offset from a base address of the data block store the same data value) or in different arrangements, with the processor applying an address translation appropriate to the selected source location.

The method may also include storing a second data block in only a first one of the mirror locations. A descriptor of the second data block is created, with the descriptor including a status indicator that indicates that the second data block is not mirrored. A second instruction is sent to the processor to read the stored data for at least a portion of the second data block; during execution of the second instruction, the processor accesses the descriptor of the second data block to determine that the second data block is not mirrored and selects the first one of the mirror locations as a source location from which to read the data.

The following detailed description together with the accompanying drawings will provide a better understanding of the nature and advantages of the present invention.

DETAILED DESCRIPTION OF THE INVENTION

Embodiments of the present invention provide systems and methods for mirroring blocks of data to multiple storage locations and dynamically selecting one of the mirrored copies to access each time a read access is needed. A data block (such as a texture or other surface, vertex list, command sequence, or the like) is stored in two or more locations, e.g., in a local memory and a system memory, which can be connected to a processor by different buses. The processor directs each read operation for mirrored data to one or another of the mirror locations, with the location being selected dynamically based on information about which bus or mirror location is best able to handle the request at that time. In some embodiments, the selection of a mirror location to access is based at least in part on information about the level of activity on one or more of the buses via which the data is accessible.

Figure 1:
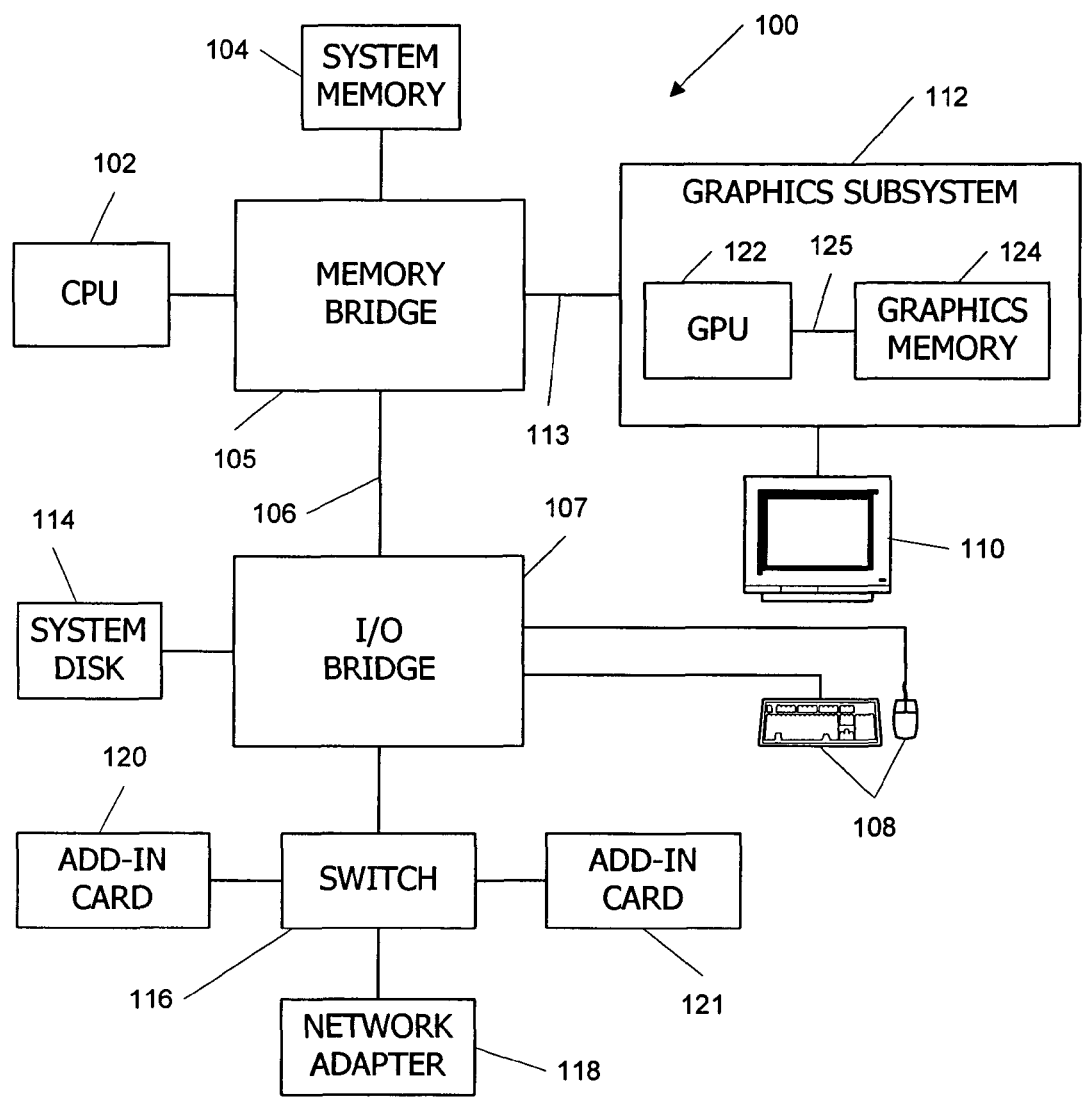
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a memory bridge 105. Memory bridge 105 is connected via a bus 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel-based display device 110 (e.g., a conventional cathode ray tube (CRT) or liquid crystal display (LCD) monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. In some embodiments, some or all of the connections among various components of system 100—e.g., between memory bridge 105 and graphics subsystem 112, between memory bridge 105 and I/O bridge 107, and between I/O bridge 107 and switch 116—are implemented using PCI-Express (PCI-E). In other embodiments, some or all of these connections may be implemented using other bus protocols such as PCI, Accelerated Graphics Port (AGP), Hypertransport, or any other bus protocol.

Graphics processing subsystem 112 includes a graphics processing unit (GPU) 122 and a graphics memory 124 communicating via a dedicated "local" bus 125. GPU 122 and graphics memory 124 may be implemented, e.g., using generally conventional integrated circuit devices such as programmable processors, application specific integrated circuits (ASICs), DRAMs or other memory devices, and the like. GPU 122 is advantageously configured with multiple execution cores that perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store in graphics memory 124 pixel data received via bus 113, with or without further processing. GPU 122 advantageously also includes a scanout pipeline for delivering pixel data from graphics memory 124 to display device 110. Any combination of rendering and scanout operations can be implemented in GPU 122, and a detailed description is omitted as not being critical to understanding the present invention.

It will be appreciated that the system shown herein is illustrative and that variations and modifications are possible. The number and arrangement of bus devices and bridges may be modified as desired; for instance, a graphics subsystem could be connected to I/O bridge 107 rather than memory bridge 105, or I/O bridge 107 and memory bridge 105 might be integrated into a single chip. In some embodiments, a graphics processor is integrated with a bus bridge on a single chip. The topology may also be varied; in one alternative embodiment, the system memory is connected to the CPU directly rather than through a bridge.

Any number of graphics processors may be included (e.g., by connecting multiple graphics processors to bus 113), and such processors may be operated in parallel to generate images for the same display device or for different display devices. Each graphics processor may have any amount of local graphics memory, including no local memory, and a graphics processor may use local memory and system memory in any combination.

Figure 2:
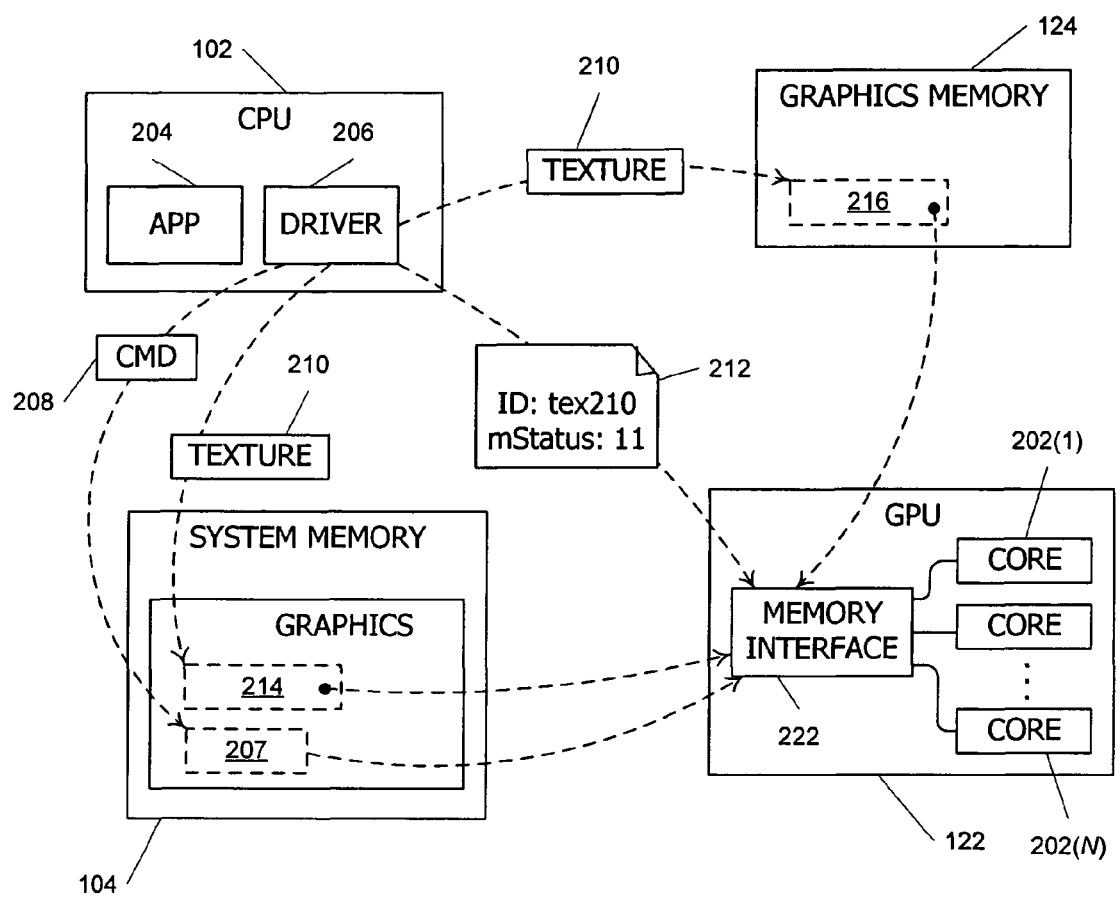
FIG. 2 is a simplified block diagram showing communication of data among components of a computer system according to an embodiment of the present invention.

FIG. 2 is a simplified block diagram showing communication of data and commands among CPU 102, system memory 104, graphics memory 124, and GPU 122 according to an embodiment of the present invention. For convenience, the bus paths connecting the components are not shown; dashed lines are used to indicate movement of data between system components. In this embodiment, a region 202 in system memory 104 is allocated to graphics use and is accessible by GPU 122; the rest of system memory 104 is available for other uses and is not accessible by GPU 122. In some embodiments, region 202 is a contiguous block in a virtual address space that maps to the system memory device.

CPU 102 executes an application program (app) 204 that includes commands for generating graphics images and a graphics driver program 206 that manages communication between CPU 102 and GPU 122. The communication is advantageously asynchronous: in response to instructions from application program 204, graphics driver program 206 queues commands 208 for execution by GPU 122 in a command buffer 207 within region 202 of system memory 104, and GPU 122 reads and executes queued commands 208 from command buffer 207. Driver program 206 also stores, in system memory 104 and graphics memory 124, data that will be needed by GPU 122 to execute commands 208 including vertex data and surfaces such as textures, stencil buffers and the like. Any data block can be written to either or both of system memory 104 and graphics memory 124. For example, in one embodiment, a texture surface 210 is written to both system memory 104 and graphics memory 124. Data written to two (or more) memories is referred to herein as being "mirrored," and the memories to which the data is written are referred to as "mirror locations."

In some embodiments, driver 206 mirrors all data that is to be read by GPU 122 in system memory 104 and graphics memory 124. In other embodiments, driver 206 selectively mirrors portions of the data, while other portions of the data are stored in only one of system memory 104 and graphics memory 124. Driver 206 may determine which portions of the data to mirror based on various considerations. For instance, it can be difficult or counterproductive to keep the mirror locations coherent (i.e., containing consistent data) when the data being stored is subject to frequent updating; thus, mirroring in some embodiments is limited to relatively static data such as texture surfaces.

Further, where the total amount of memory available in graphics memory 124 and graphics-allocated portion 202 of system memory 104 is not sufficient to store all of the data (or all of the relatively static data), data can be selectively mirrored. In one embodiment, the driver includes code that measures relative frequency of read requests for different data blocks (e.g., surfaces, vertex lists, command buffers) and mirrors the most frequently read blocks. Such code can be similar to code used in conventional graphics systems for swapping textures in and out of memory based on usage patterns. For instance, the driver can compile usage statistics for various data blocks as the application program executes and can optimize the selection of data to be mirrored based on the usage statistics, e.g., so that the data targeted by the most requests is more likely to be mirrored. In another embodiment, the application program interface (API) for the graphics driver might include optional commands by which an application programmer can recommend that a particular data block should be mirrored or not mirrored. The driver advantageously follows such recommendations to the extent permitted by system resources.

When driver 206 determines that a data block (e.g., texture 210) is to be mirrored, the driver writes one copy of the data block to system memory 104 (at location 214) and another copy to graphics memory 124 (at location 216). In some embodiments, the copies are organized identically so that either copy can be accessed by an address formed from a base pointer that is generally different between the two copies and an offset that is the same for both copies. Thus, for instance, if the data for a mirrored surface is arranged in a tiled format in graphics memory 124, the copy in system memory 104 is advantageously arranged in the same tiled format. Identical organization of the mirror copies can simplify the addressing logic in memory interface 222 but is not required; in some embodiments, memory interface 222 can perform device-specific address translation operations for accessing different mirror locations.

For each data block that driver 206 stores, whether mirrored or not, driver 206 provides a state information bundle 212 describing that data block to GPU 122. State information bundle 212 advantageously includes a unique identifier (ID) of the data block and a mirror status (mStatus) value indicating whether the data is stored in system memory, local memory or both. In one embodiment, a two-bit mStatus value is used, with "01" indicating that the data is stored only in local memory, "10" that the data is stored only in system memory, and "11" that the data is stored in both memories.

State information bundle 212 may provide additional information about the data block. For example, where more than two possible mirror locations exist, state information bundle 212 advantageously indicates whether a copy of the particular data block exists in each such location. Further, a starting address for the data block in each location where it exists could be provided, as well as information defining an applicable address translation function for each location.

GPU 122 is shown as including multiple execution cores 220(1) to 220(N) and a memory interface 222. Execution cores 220(1) to 220(N) operate in parallel to perform rendering and/or scanout operations in response to commands 208 read from system memory 104 and delivered to cores 220(1) to 220(N) by memory interface 222. In one embodiment, one of cores 220(1) to 220(N) performs scanout operations while the other cores perform rendering operations; it will be appreciated that other configurations may be used. Any number N of cores (including just one core) may be provided, and each core may be of generally conventional design.

From time to time, cores 220(1) to 220(N) require access to data stored in system memory 104 or graphics memory 124. At such times, cores 220(1) to 220(N) send requests for data to memory interface 222. Each request advantageously includes the unique identifier of the state information bundle 212 associated with the data block that is to be accessed and may also include information (e.g., coordinate or offset values) identifying the specific portion of the data block to be accessed. Memory interface 222 uses state information bundle 212 to determine where the requested data is located and to generate an appropriate data transfer request to graphics memory 124 via local bus 125 (FIG. 1) or to system memory 104 via system bus 113 (FIG. 1). Where state information bundle 212 indicates that the data is mirrored in multiple locations, memory interface 222 selects one of the locations and sends a data transfer request via the corresponding bus. Specific techniques for selecting among mirror locations are described below.

Memory interface 222 also includes components configured to receive responses to data transfer requests from the memory devices and to direct the data back to the requesting one of cores 220(1) to 220(N). Such components may be of conventional design.

Figure 3:
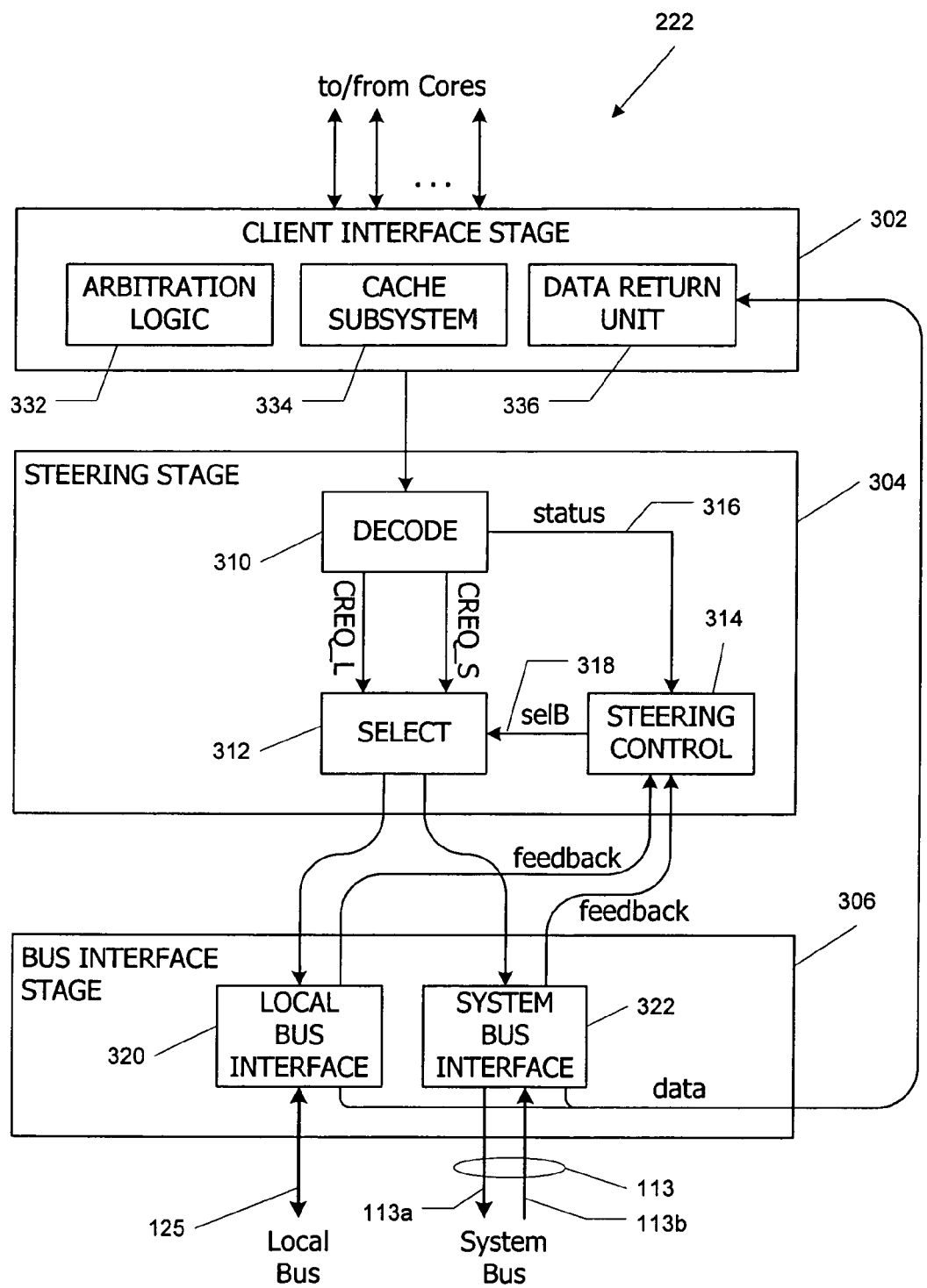
FIG. 3 is a block diagram of a memory interface for a graphics processor according to an embodiment of the present invention.

FIG. 3 is a block diagram of memory interface 222 according to an embodiment of the present invention. In this embodiment, memory interface 222 includes a client interface section 302, a steering section 304, and a bus interface section 306.

Client interface section 302 receives requests for data from cores 220(1) to 220(N) (also referred to herein as "clients" of memory interface 222) and generates a request stream based on the received requests. Client interface section 302 advantageously includes arbitration logic 332 that arbitrates among requests from different ones of cores 220(1) to 220(N); such logic may be of conventional design and may implement, e.g., round-robin selection, priority-based selection, or other arbitration algorithms. In some embodiments, client interface section 302 also includes a cache subsystem 334, which may also be of generally conventional design, that stores a limited amount of recently requested data. Where possible, requests are satisfied from cache subsystem 334 and are not forwarded to other sections of memory interface 222. Client interface section 302 also includes a data return unit 336 that directs received data to the requesting one of cores 220(1) to 220(N). It will be appreciated that a particular client interface is not critical to the present invention.

If a request cannot be satisfied from cache subsystem 334, client interface section 302 forwards the request to steering section 304. Steering section 304 determines whether each request should be directed to graphics memory 124 via local bus 125 or to system memory 104 via system bus 113 and generates an appropriate request. Steering section 304 includes a decoder circuit 310, a selection circuit 312 and a steering control circuit 314. In operation, decoder circuit 310 identifies the (one or more) locations where the data can be accessed and generates a candidate data transfer request (CREQ_L, CREQ_S) for each such location. As described further below, steering control circuit 314 determines which location is to be used to handle the current request and generates a selB signal on line 318 identifying the selected candidate request. In response to the selB signal, selection circuit 312 forwards the selected candidate request to bus interface section 306; for each data request, selection circuit 312 advantageously forwards only one candidate request.

Bus interface section 306 includes a local bus interface 320 and a system bus interface 322. Bus interfaces 320 and 322, which may be of generally conventional design, include appropriate control logic for driving requests onto local bus 125 and system bus 113, respectively. Each of bus interfaces 320, 322 may also include control logic for optimizing the request stream being transmitted on that bus (e.g., by reordering requests for improved memory performance, as is known in the art). In some embodiments, such as where system bus 113 is a PCI-E bus, system bus 113 has separate inbound and outbound paths 113a, 113b for sending and receiving signals. In some embodiments, local bus 125 may also include separate inbound and outbound paths.

Bus interfaces 320 and 322 also include logic for receiving and interpreting signals sent by other devices on buses 125 and 113, respectively. Thus, bus interfaces 320 and 322 recognize when data responsive to a data transfer request sent via that interface is received via buses 125 or 113 and to direct the data to data return unit 336 of client interface section 302. Data return unit 336, which may be of generally conventional design, routes the data to the requesting core and may also cache the data in cache subsystem 334 for subsequent reuse.

One or both of bus interfaces 320 and 320 are also configured to communicate feedback information to steering control circuit 314. The feedback information is usable to determine a level of activity on the respective buses, e.g., the amount of data being carried on each bus and/or the fraction of the maximum bus bandwidth currently being used. As described below, steering control circuit 314 advantageously uses the level of activity determined from the feedback information to select a location from which mirrored data is to be read.

In some embodiments, responses to some requests might be received out of order with respect to the order in which the requests arrived at client interface 302 or with respect to the order in which the requests were forwarded from steering section 304 to bus interface section 306. In some embodiments, memory interface 222 handles out-of-order receipt of data, e.g., using techniques known in the art. In one such embodiment, data return unit 336 of client interface section 302 includes a queue in which all requests from a particular core (or all requests from all cores) are queued in the order of receipt. As data is received, the data is matched to one of the queued requests. When the request at the head of the queue has its data, the data is returned to the requesting core. In other embodiments, some or all of the cores may be configured to handle data received out of order, and data return unit 336 may return requested data to the cores as it is received.

Figure 4:
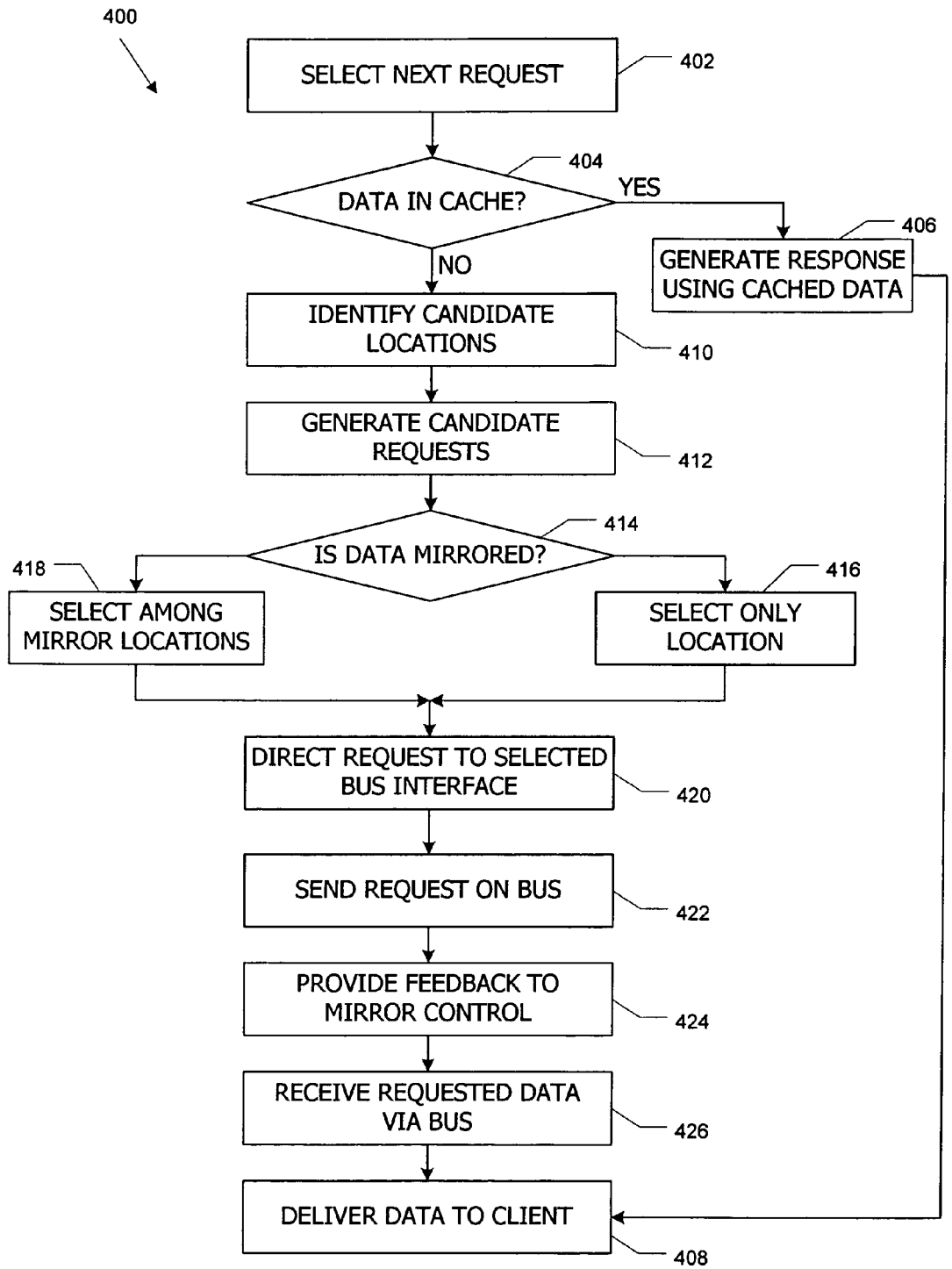
FIG. 4 is a flow diagram showing the operational process of the memory interface of FIG. 3 according to an embodiment of the present invention.

Operation of memory interface 222 according to an embodiment of the present invention will now be further described with reference to the flow diagram of FIG. 4.

At step 402, arbitration logic 332 of client interface section 302 selects a request from one of cores 220(1) to 220(N) for processing. Each request advantageously includes the identifier of the state information bundle 212 (FIG. 2) for the data block (e.g., surface, vertex list, command buffer, etc.) that is to be read. At step 404, client interface section 302 determines whether the data can be provided from cache subsystem 334. If so, client interface section 302 fetches the data from the cache at step 406 and returns it, via data return unit 336, to the requesting core at step 408. In some embodiments, step 408 may include holding the data in a reordering queue as described above until the data from any preceding requests has been delivered to the requesting core. It should be noted that a cache subsystem is optional, and steps 404 and 406 may be omitted.

If, at step 404, the data is not available from cache subsystem 334, then client interface section 302 forwards the request (including the identifier of the state information bundle) to steering section 304.

At step 410, decoder circuit 310 of steering section 304 processes the state information bundle 212 for the data block identified in the request to determine which memory or memories contain copies of that data block. Decoder circuit 310 provides a status signal on path 316 indicating which memory or memories contain copies of the data block. The status signal advantageously has distinct states representing storage in local memory only, system memory only, or both memories. In some embodiments, the status signal may also identify a preferred mirror location from which to read the data. In one embodiment, the status value mStatus stored in state information bundle 212 (FIG. 2) is used as the status signal.

At step 412, decoder circuit 310 generates an appropriately formatted candidate request (CREQ_L for local memory, CREQ_S for system memory) for each memory in which the data resides. Decoder circuit 310 advantageously includes any necessary address translation logic, tiling logic, and the like needed to generate the appropriate address range in each memory device. In one embodiment, CREQ_L is generated only when the data exists in local memory, and CREQ_S only when the data exists in system memory; thus, decoder circuit 310 might generate one or two candidate requests for a given input requests, depending on whether the requested data is mirrored. Where the data is mirrored, decoder circuit 310 can apply different address translation algorithms for each mirror location in the event that the data block is arranged differently in different mirror locations. The state information bundle 212 advantageously provides information from which decoder circuit 310 can determine the appropriate algorithm for each mirror location.

At step 414, steering control circuit 314 determines whether the requested data is mirrored, based on the status signal from decoder circuit 310. If the data is not mirrored, then at step 416 steering control circuit 314 selects the only available location and asserts a selB signal on line 318 to select the corresponding candidate request: CREQ_L in the event that the data is only in local memory or CREQ_S in the event that the data is only in system memory.

If the data is mirrored, then at step 418 steering control circuit 314 selects one of the mirror locations to provide the data for this request. In some embodiments, the selection is based at least in part on the feedback signals received from one or both of local bus interface 320 and system bus interface 322; specific implementations are described below. Steering control circuit 314 drives the signal selB on path 318 to indicate whether local memory or system memory is selected.

At step 420, selection circuit 312 responds to the selB signal by directing the selected candidate request to the corresponding bus interface. Specifically, if local memory is selected, selection circuit 312 forwards the local candidate request (CREQ_L) to local bus interface 320; if system memory is selected, selection circuit 312 forwards the system candidate request (CREQ_S) to system bus interface 322. For each request, only one candidate request is forwarded to a bus interface, thereby avoiding duplicative bus traffic.

At step 422, the selected one of bus interfaces 320 and 322 sends the request on the selected bus (either local bus 125 or system bus 113). At step 424, the selected bus interface provides feedback data to steering control circuit 314; this data is advantageously used in processing subsequent requests for mirrored data, and specific examples of feedback data are described below. Feedback information is advantageously provided without regard to whether a particular request was for mirrored or unmirrored data. At step 426, the selected one of bus interfaces 320, 322 receives the requested data from the memory device via the bus. At step 408, as described above, the bus interface directs the received data to data return unit 336 of client interface section 302 for delivery to the requesting core.

It will be appreciated that the memory interface and operating method described herein are illustrative and that variations and modifications are possible. Method steps described as sequential may be executed in parallel, order of steps may be varied, and steps may be modified or combined. In one alternative embodiment, selection of a memory location from which to read data precedes generation of a data transfer request, and only one data transfer request is generated for each incoming request. Thus, for example, tiling or other address generation logic can be applied after a mirror location is selected. The steering control circuit can use other information in addition to or instead of feedback signals to select among mirror locations in the event that the data is mirrored; examples of such information are described below. In some embodiments, as described below, only one of the bus interfaces provides feedback while in other embodiments, both of the bus interfaces provide feedback.

The memory interface may also include other components aside from those described herein. For instance, in some embodiments, the memory interface may include components configured to respond to data transfer requests received via system bus 113 from another device, such as CPU 102 (FIG. 1). It should be noted that in the embodiment of FIG. 3, information as to whether and where data is mirrored is used only in steering section 304. All other components of the memory interface can be configured to treat requests for mirrored and unmirrored data identically.

Figure 5:
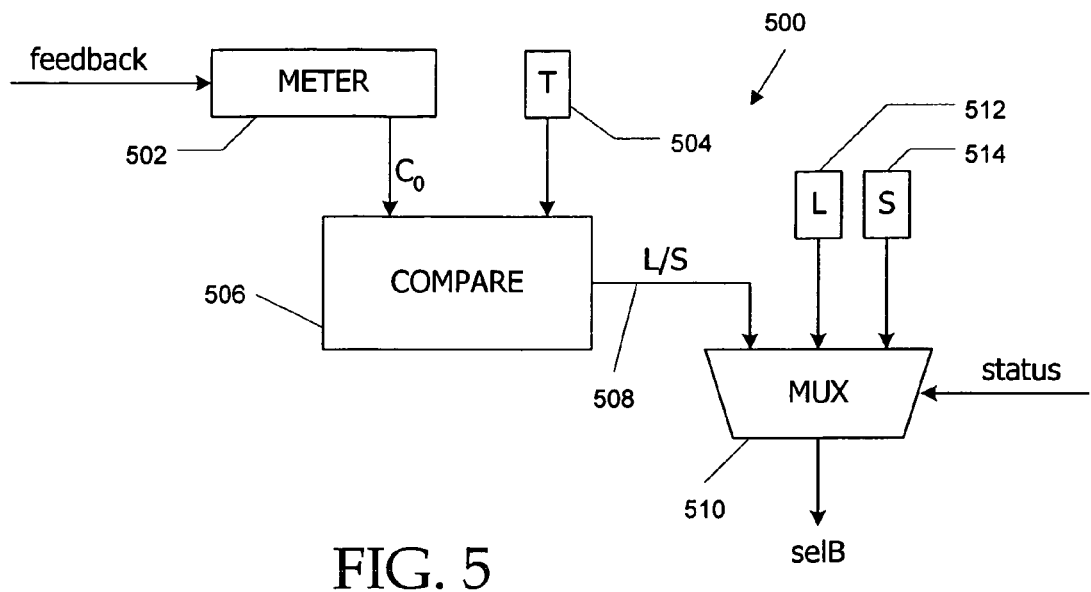
FIG. 5 is a block diagram of selection control logic for a memory interface according to an embodiment of the present invention.

The steering control circuit will now be described. FIG. 5 is a block diagram of steering control circuit 500 implementing steering control circuit 314 (FIG. 3) according to an embodiment of the present invention. Steering control circuit 500 determines which bus to use for a mirrored data request based on a measured level of activity on a "metered" one of the local bus and the system bus. Requests for mirrored data are directed to the metered bus as long as the level of activity on the metered bus is below a predefined threshold level. If the level of activity reaches the threshold, steering control circuit 500 directs requests for mirrored data to the non-metered bus (i.e., the other one of the local bus and the system bus) until such time as the level of activity on the metered bus drops below the threshold. Steering control circuit 500 also directs all requests for unmirrored data to the sole memory in which the unmirrored data resides, regardless of the activity level on the metered bus.

Steering control circuit 500 includes a meter circuit 502 (described below) that receives a feedback signal from the metered bus. In one embodiment, the feedback signal indicates the amount of data associated with each request sent on the metered bus, and meter circuit 502 uses this feedback signal to generate an activity level value (C) reflecting the amount of data the metered bus is currently handling. In one embodiment, local bus 125 is metered because maximizing use of local bus 125 reduces contention with other system devices for access to system memory 104 (FIG. 1); in other embodiments the metered bus may be system bus 113. As described below, in some embodiments, both buses are metered.

A register 504 stores a constant threshold value (T). The threshold value is advantageously defined to be equal to an activity level (C) value that represents saturation or near-saturation of the metered bus. Particular choices for the threshold value T are described below in connection with specific implementations of meter circuit 502. In some embodiments, the threshold value T is a configurable parameter of the system, whose value can be determined, e.g., at system startup.

A comparison circuit 506 compares the measured activity level value C to the threshold value T and generates a candidate state for the selB signal on a path 508. In the embodiment shown herein, the selB signal assumes one of two states (L or S, which may be, e.g., logic high and logic low levels, respectively) denoting selection of the local bus (value L) or system bus (value S). If the local bus is metered, compare circuit 506 asserts the value L on path 508 when C<T and the value S on path 508 when C>T. Similarly, if the system bus is metered, compare circuit 506 asserts the value S on path 508 when C<T and the value L on path 508 when C>T. (The special case C=T may result in either L or S being selected, depending on implementation of comparison circuit 506.) In this embodiment, an independent decision is made each time mirrored data is requested, and the decision is based on real-time information about activity or the metered bus.

Path 508 provides the L/S selection as one of three candidate values to a multiplexer (mux) 510. The other two candidate values are provided by registers 512, 514, which store the L value and the S value, respectively. The status signal from decoder 310 (FIG. 3) controls mux 510 such that the L value from register 512 is always selected if the data is only available in local memory, the S value from register 514 is always selected if the data is only available in system memory, and the L/S selection from path 508 is always selected if the data is mirrored. The state of the L/S selection signal can be changed as described above; thus, when the data is mirrored, either local memory or system memory is dynamically selected. In another embodiment, the status signal may select a preferred one of the L value from register 512 and the S value from register 514 even if the data is mirrored; this feature can be used, e.g., to implement a runtime control option that disables dynamic selection of mirror locations.

Figure 6:
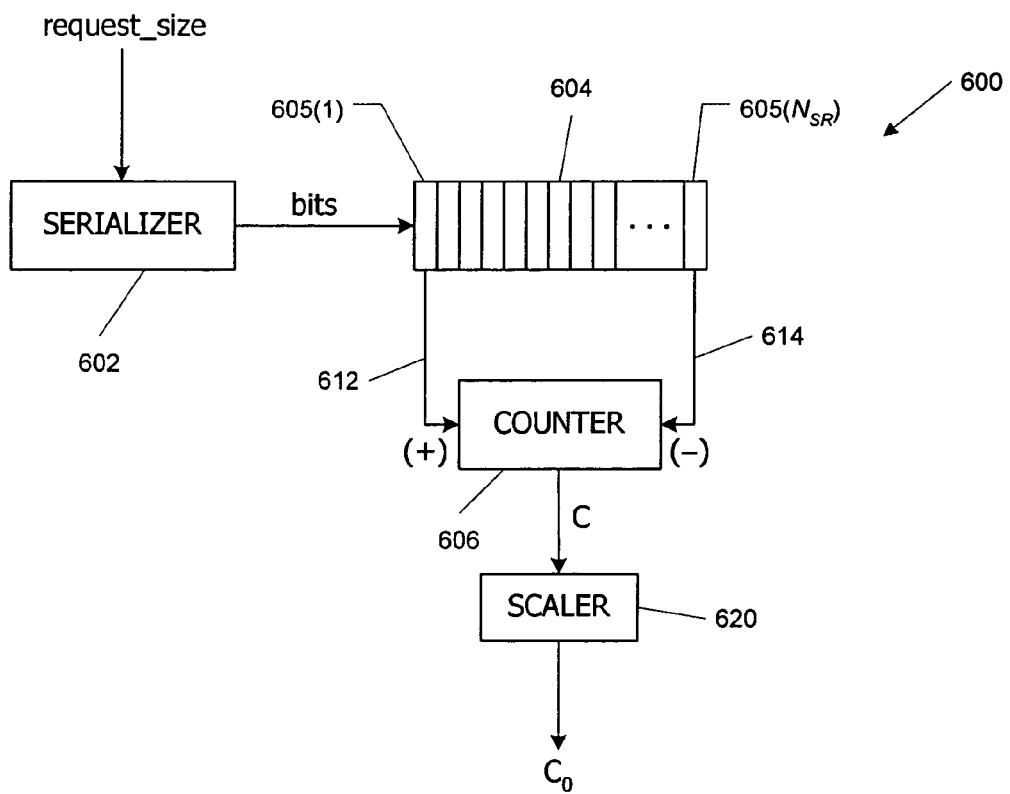
FIG. 6 is a block diagram of a meter circuit for a memory interface according to an embodiment of the present invention.

Specific embodiments of meter circuit 502 will now be described. FIG. 6 is a block diagram of a meter circuit 600 implementing meter circuit 502 according to an embodiment of the present invention. Meter circuit 600 includes a serializer 602, a shift register 604, and a counter 606. Serializer 602 receives request size information for each data transfer request transmitted on the metered bus and generates a bit corresponding to each cycle of a data clock (not explicitly shown). The data clock may operate at the same clock rate as the metered bus, and the bit value generated by serializer 602 for each cycle reflects whether the bus interface unit 320 (or 322, as the case may be) for the metered bus requested data during that cycle. In one embodiment, a bit with value "1" (or logic high) is generated for each cycle when data is requested and a bit with value "0" (or logic low) is generated for each cycle when data is not requested. Where the amount of data associated with a request is variable, serializer 602 advantageously generates one or more "1" bits, depending on the size of the request. For example, in one embodiment, 16 bytes of data can be transmitted per data clock. A 64-byte request requires four clocks, and serializer 602 would generate the bit sequence "1111" upon receiving a signal indicating a request size of 64 bytes. The bit generated by serializer 602 on each clock cycle is loaded into shift register 604. In embodiments where GPU 122 also sends write requests on the metered bus, serializer 602 may also generate a "1" bit for each cycle when write data is being transferred onto the metered bus. The operation of serializer 602 is advantageously independent of whether a particular request refers to mirrored or unmirrored data.

Shift register 604, which may be of generally conventional design, includes a series of latches (or nodes) 605(1) to 605(N$_{SR}$) coupled such that data bits are loaded into latch 605(1) and shift from one latch to the next synchronously with the data clock. Any number N$_{SR}$ of latches may be included, and shifting of data from one latch 605 to the next is advantageously synchronized with the data clock.

Counter 606 is configured to provide a running count C of the number of "1" bits in shift register 604 and is advantageously capable of counting up to at least N$_{SR}$ without saturating or wrapping. Counter 606 is incremented in response to a signal on line 612 that is asserted each time a logic high bit is loaded into latch 605(1) of shift register 606 and is decremented in response to a signal on line 614 that is asserted each time a logic high bit reaches the output of latch 605(N$_{SR}$). Thus, the count value C provided by counter 606 reflects the number of data clock cycles, during the most recent N$_{SR}$ cycles, that produced (or that will produce) data on the bus.

In some embodiments, meter circuit 600 also includes a scaling circuit 620 that rescales the value C generated by counter 606 to a final value C$_0$. Scaling circuit 620 is used to adjust the count value C into a convenient range for comparison to the threshold value T. In some embodiments using binary numbers, scaling is by powers of two, and scaling circuit 620 can be implemented as a left-shift and/or right-shift circuit; the shift amount and direction can be configurable. In other embodiments, scaling circuit 620 may be a multiplier for scaling by an arbitrary scaling factor, which may be a configurable system parameter. In still other embodiments, scaling circuit 620 may be omitted, in which case C$_0$ is just C. Scaling circuit 620 can be particularly useful in alternative embodiments in which both buses are metered, as described below.

As noted above, shift register 604 may include any number N$_{SR}$ of latches. In one embodiment, N$_{SR}$=100, and the count value C directly represents the percentage of time that the bus is being used to transmit data. In another embodiment, N$_{SR}$ is selected such that C=100 (or some other preselected value of C) represents approximately the maximum utilization of the bus to transmit data (i.e., a saturation condition); since it is generally not possible for a bus to move data during every clock cycle, N$_{SR}$ would be somewhat larger than 100. For instance, as is known in the art, some buses support data transfer operations on up to about 80% of clock cycles, with the remaining clock cycles being used for other purposes. If N$_{SR}$ is chosen to be 125, then C=100 would correspond to a saturation condition (i.e., data being carried 80% of the time). In some embodiments, shift register 604 may be implemented with a large number of latches 605 and control logic allowing the readout point (line 614) to be selectably coupled to different ones of latches 605; thus, the parameter N$_{SR}$ can be configurable.

As described above with reference to FIG. 5, the count value C produced by meter circuit 600 is compared to a threshold value T by comparison circuit 506. In this embodiment, threshold value T is advantageously less than N$_{SR}$ and also advantageously approximately equal to the value of C that corresponds to saturation of the bus. For instance, in an embodiment where N$_{SR}$=125 and the bus can be used for data transfer up to 80% of the time, a value of T=95 (corresponding to 95% of saturation) might be selected. In some embodiments, the threshold value T is a configurable system parameter whose value can be adjusted according to the available bandwidth of the bus in a particular implementation.

It will be appreciated that meter circuit 600 is illustrative and that variations and modifications are possible. Other counters and/or meter mechanisms capable of measuring the amount of data that is being requested from (and/or delivered to) a memory device via a bus may be substituted for the shift-register-driven counter described herein. For example, where the local bus interface and/or system bus interface maintains a request queue, bus activity might be inferred based on the number of requests in the queue. In some embodiments where requests can be sent to two or more different memory devices via the metered bus, the meter circuit only counts requests sent to a particular memory device; in other embodiments, the meter circuit counts requests sent to different memory devices separately; and in still other embodiments, the meter circuit maintains a single count based on all requests to all memory devices on the metered bus. Where memory interface 222 processes both read and write requests, the meter circuit might count read and write requests separately, or it might count only read requests or only write requests, or it might count read and write requests together.

In other embodiments, the amount of data associated with each request is a constant, and the meter circuit can reliably measure the bus activity by simply counting the number of requests that are transmitted. In still other embodiments, the meter circuit directly applies the request size (or some multiple thereof) to a counter, and a periodic timed pulse decrements the counter. In this embodiment, the counter is advantageously configured to saturate at a predetermined value and to clamp at zero.

In some embodiments, the graphics subsystem might not be the only device making requests of a shared memory device such as system memory 104, and meter circuit 600, which monitors requests initiated within the graphics subsystem but not requests initiated by other devices, might underestimate the input/output (I/O) load on a shared memory device. ("I/O" is used herein to refer generally to all data transfers into and/or out of a memory device without limitation as to the nature of other source or destination devices involved in the transfer or the communication channel used.) In instances where the I/O load on the memory device, rather than bus bandwidth, is a limiting factor, meter circuit 600 might not reliably detect when the I/O load is approaching a saturation point. In some embodiments, a meter might be incorporated into the system memory controller to measure the I/O load on system memory directly. Such a meter could supply feedback information that the graphics processor could use in selecting between local memory and system memory.

Another alternative embodiment of a meter circuit estimates the total load on a memory device based on the latency (or delay) in receiving responses from that device, relying on the principle that, at least when the memory device is heavily loaded, the latency should be correlated with the total I/O load on the memory device.

Figure 7:
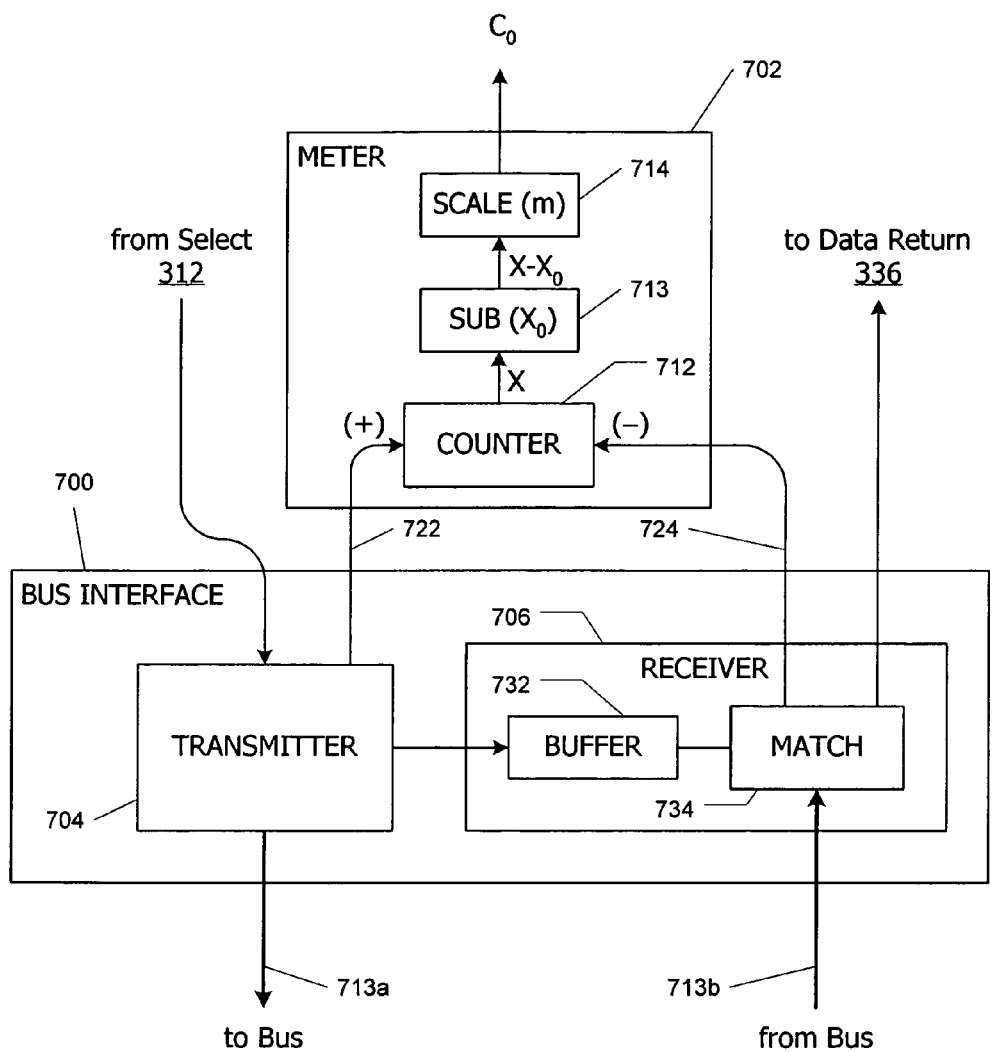
FIG. 7 is a block diagram of a meter circuit for a memory interface according to another embodiment of the present invention.

For example, FIG. 7 is a block diagram of a meter circuit 702 implementing meter circuit 502 according to another embodiment of the present invention. Meter circuit 702 includes a counter 712 that is operated in response to signals received from a bus interface unit 700 of the metered bus (e.g., system bus 113). Meter circuit 702 estimates the level of I/O activity at the remote device based on the number of "pending" requests, i.e., requests that have been transmitted to the memory device by bus interface unit 700 but for which a response has not yet been received.

Bus interface unit 700 includes a transmitter module 704 and a receiver module 706. Transmitter module 704, which may be of generally conventional design, transmits requests onto an outbound bus path 113a. Receiver module 706 is coupled to an inbound bus path 113b and receives responses to requests sent by transmitter module 704. In some embodiments, the same bus paths are used for inbound and outbound signals, and transmitter module 704 and receiver module 706 are coupled to the same path; separate inbound and outbound paths are not required.

Receiver module 706 includes a pending request buffer 732 and a match logic unit 734. In operation, each time transmitter module 704 sends a request on outbound path 113a, information about the request is provided to receiver module 706 for use in matching responses to requests. Such information may be generally conventional in nature and may include, e.g., a unique serial number or other tag identifying the request and an identifier of the one of cores 202(1) to 202(N) that initiated the request. Receiver module 706 stores this information in pending request buffer 732. When a response to a request is received on inbound path 113b, match logic unit 734 matches identifying information in the response (e.g., the serial number or tag) to an entry in buffer 732 and directs the response to the appropriate one of cores 202(1) to 202(N). It should be noted that for purposes of determining the number of outstanding requests, match logic unit 734 is not required.

Meter circuit 702 includes a counter 712. Counter 712 is incremented in response to a signal on line 722 that is asserted each time a request is sent by transmitter module 704. Counter 712 is decremented in response to a signal on line 724 that is asserted each time a response is matched to a pending request by match logic unit 734 of receiver module 706. Thus, provided that the remote device can be expected to generate a response to every request, the count value X produced by counter 712 represents the number of pending requests for bus interface unit 700.

In some embodiments, meter circuit 702 also includes a subtraction circuit 713 that subtracts a baseline value $X_0$ from the value X generated by counter 712, a scaling circuit 714 that rescales the value $(X-X_0)$ by a scaling factor m to determine a final value $C_0$. Subtraction circuit 713 and scaling circuit 714 are used to adjust the count value X for comparison to the threshold value T.

More specifically, in this embodiment, it is assumed that the number of pending data transfer requests is related to the level of I/O activity in the memory device, at least in cases where the level of activity in the memory device is near saturation. The relationship in the near-saturation region is expressed using a linear approximation as:

$$Y=m*(X-X_0), \quad (1)$$

where Y represents the level of activity in the memory device (defined in such a way that Y=0 when $X=X_0$) and m, and $X_0$ are adjustable parameters whose values depend on the particular implementation. At some activity level Y=T that is near the saturation level, it becomes desirable to stop sending further requests onto the metered bus. Subtraction circuit 713 and scaling circuit 714 produce a value $C_0$ that corresponds to Y in Eq. (1), allowing a direct comparison to the threshold activity level T. Accordingly, subtraction circuit 713, which may be implemented using conventional circuit techniques, advantageously clamps its result to zero (meaning that a value of zero is generated whenever $X<X_0$). Thus, when bus activity is low, $C_0$ measures bus activity only to the extent of indicating that the activity level is sufficiently low that saturation is not a concern. It should be noted that parameters m and $X_0$ are implementation-dependent and can be determined, e.g., by empirical measurements of a particular bus configuration. In one embodiment where the maximum number of outstanding requests is 32, $X_0=7$ and m=4; other values may also be used.

Scaling circuit 714 may be implemented in various ways. For instance, in some embodiments where values are represented as binary digits, the scaling factor m is advantageously selected to be a power of 2, and scaling circuit 714 can be implemented as a left-shift and/or right-shift circuit; the shift amount and direction can be configurable. In other embodiments, scaling circuit 714 may be a multiplier for scaling by an arbitrary scaling factor m, which may be a configurable system parameter.

In still other embodiments, subtraction circuit 713 and scaling circuit 714 may be omitted, in which case $C_0$ is just X. Like scaling circuit 620 described above, subtraction circuit 713 and scaling circuit 714 can be useful in alternative embodiments in which both buses are metered, as described below.

As described above with reference to FIG. 5, the count value $C_0$ produced by meter circuit 702 is compared to a threshold value T by comparison circuit 506.

It will be appreciated that meter circuit 702 is also illustrative and that variations and modifications are possible. The particular equations and parameter values used to select a threshold value for the mirror selection logic may be modified as desired. For instance, persons of ordinary skill in the art will recognize that an actual linear relationship between the number of pending requests X and the activity level Y of the memory device is not required for the present invention, and other embodiments may implement nonlinear relationships. In addition, threshold value T can be directly configured based on experience in a particular system implementation. In some embodiments, the threshold value T is defined such that subtracting and scaling are not required. For instance, Eq. (1) can be solved for X:

$$X=(Y/m)+X_0, \quad (2)$$

from which one can define an alternative threshold T as:

$$T=(T/m)+X_0. \quad (3)$$

Threshold T can be compared directly to X without scaling or subtraction.

In addition, other counters and/or logic circuits capable of measuring pending requests to a memory device may be substituted for the counter described herein. In some embodiments where the bus interface unit sends requests to multiple memory devices, the meter circuit only counts pending request for a particular memory device; in other such embodiments, the meter circuit counts pending requests for different memory devices separately; and in still other embodiments, the meter circuit maintains a single count based on all pending requests for all memory devices on the metered bus. In addition, the size of the pending requests, rather than the number of such requests, may be used to measure the level of activity.

In some embodiments, as demand for various resources fluctuates, there can be periods of time when the bus limits throughput and other periods when the memory device is the limiting factor. Accordingly, it may be useful for meter 502 of FIG. 5 to implement both meter circuit 600 of FIG. 6 (which measures outstanding requests) and meter circuit 702 of FIG. 7 (which indirectly measures congestion at the memory device). In one such embodiment, meter 502 includes scaling circuits that scale the two meter-circuit outputs such that the same value (e.g., 100) on either meter represents a saturation (or near-saturation) condition and a comparison circuit that selects the larger of the scaled outputs as the bus activity level $C_0$. A determination of whether to use the metered bus can then be made by comparing $C_0$ to a threshold as described above.

In the embodiment of FIG. 5, only one of the buses is metered. As described above, the comparison circuit directs requests for mirrored data to the metered bus unless the measured activity level indicates that the metered bus is saturated (or nearly saturated), in which case requests for mirrored data are directed to the other bus. If both buses are at or near saturation, performance will be slowed regardless of which choice is made, and a meter on the second bus is not required.

In other embodiments, however, both buses can be metered, with requests for mirrored data being directed to whichever bus has the lowest measured level of activity. In such embodiments, if the capacities of the local and system buses are different, the activity level on each bus is advantageously measured as a fraction of saturation so that the I/O load is approximately balanced between the two buses.

Figure 8:
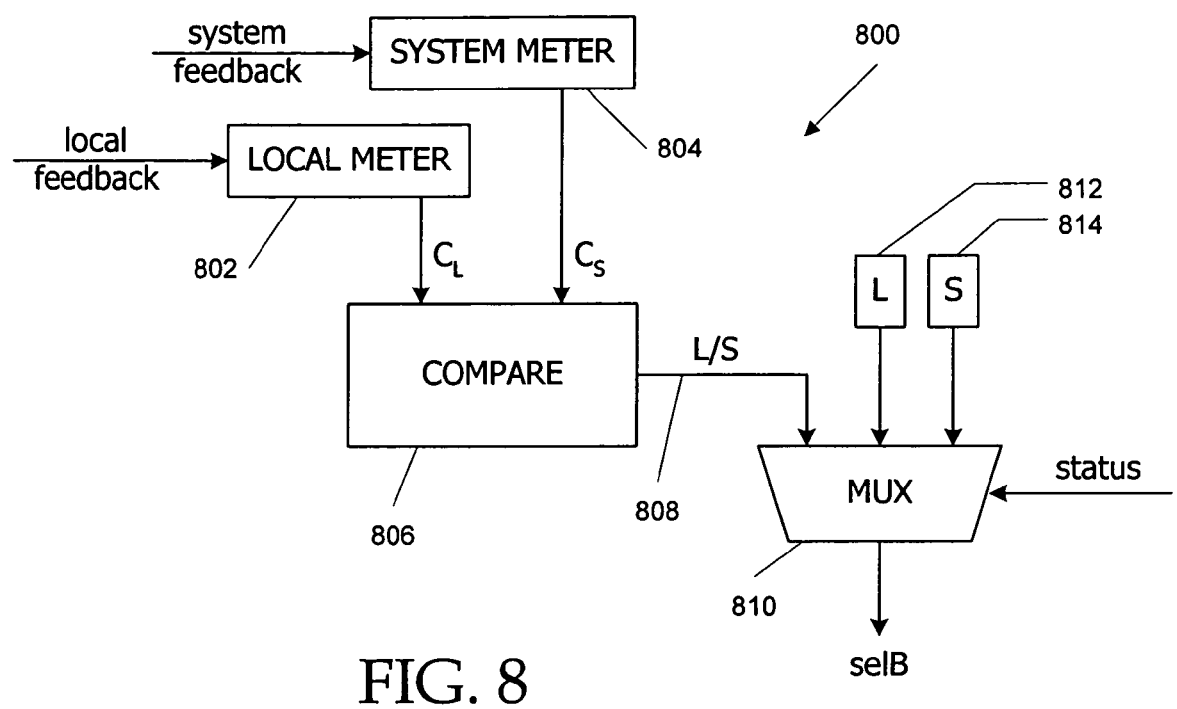
FIG. 8 is a block diagram of a selection control circuit for a memory interface according to another embodiment of the present invention.

FIG. 8 is a block diagram of a steering control circuit 800 implementing steering control circuit 314 of FIG. 3 according to an embodiment of the present invention in which both buses are metered. Steering control circuit 800 includes a local meter circuit 802 that receives a feedback signal from local bus interface unit 320 (FIG. 3) and a system meter circuit 804 that receives a feedback signal from system bus interface unit 322. In one embodiment, each feedback signal indicates the amount of data associated with each request sent on the bus in question, and meter circuits 802, 804 use these feedback signals to generate respective activity level values ($C_L$, $C_S$). Meter circuits 802, 804 are advantageously implemented such that $C_L=C_S$ represents a condition where both buses are approximately equally close to (or equally far from) saturation. For example, each of meter circuits 802, 804 may be implemented as a copy of meter circuit 600 of FIG. 6 or as a copy of meter circuit 702 of FIG. 7 described above. Both meter circuits are advantageously of similar design.

In general, the bus clock rates and saturation conditions of the local and system buses will not be equal. If meter circuits similar to circuit 600 (FIG. 6) are used, they are advantageously adapted to normalize the values $C_L$ and $C_S$ to a commensurate scale, e.g., so that each value represents the fraction or percentage of bus capacity that is being used. In one embodiment, the value of $N_{SR}$ for each shift register 604 is chosen such that the shift registers in both meter circuits measure approximately the same time interval. The bus with the higher count value is carrying more traffic and therefore closer to saturation.

In another embodiment, scaling circuits such as circuit 620 of FIG. 6 are used in one or both meters to adjust the count values to represent percentages of saturation-level bus use. For instance, in one embodiment, the local bus is 32 bits wide and operates at 300 MHz while the system bus is a PCI-E bus. The local bus throughput is approximately half that of the PCI-E bus, and the count value C for the local bus may be multiplied by 2 (left-shifted by one bit) using circuit 620 of FIG. 6 prior to comparing $C_L$ and $C_S$. In another embodiment, the local bus is 64 bits wide and operates at 577 MHz, and the system bus is a PCI-E bus; the local bus throughput is approximately twice that of the PCI-E bus, and the count value C for the system bus may be multiplied by 2 (left-shifted by one bit) in circuit 620 of FIG. 6 prior to comparing $C_L$ and $C_S$. Where a power-of-two relationship does not apply, multipliers or other circuits capable of applying a scaling factor may be used in either or both of the meter circuits, and the scaling factor may be configurable based on information about the respective capacities of the buses. In some embodiments, as noted above, the number of active nodes ($N_{SR}$) in shift register 604 can be configurable; thus, the relative lengths of the shift register in different meters can be adjusted to compensate for differences in throughput on the respective buses.

If meter circuits similar to circuit 702 of FIG. are used, the scaling circuits 714 can be used to rescale the counted number of pending requests from each bus to a corresponding level of I/O activity. In one embodiment, scaling circuit 714 in each meter circuit is configured to compute Eq. (1) using appropriate values of parameters m and b.

A comparison circuit 806 compares the measured activity level values $C_L$ and $C_S$ and, based on the result, generates a candidate value for the selB signal on a path 808.

Similarly to the embodiment shown in FIG. 5, the selB signal assumes one of two values (L or S) corresponding to selection of the local bus (selB value L) or system bus (selB value S). In one embodiment, compare circuit 806 asserts the value L on path 808 when $C_L<C_S$ and asserts the value S on path 808 when $C_L>C_S$. Thus, the asserted value corresponds to the bus that is less close to saturation. (The special case $C_L=C_S$ may result in assertion of either value L or S, depending on implementation.)

Path 808 provides the L/S selection as one of three candidate values to a mux 810. The other two candidate values are provided by registers 812, 814, which store the L value and the S value, respectively. Similarly to mux 510 of FIG. 5, the status signal from decoder 310 (FIG. 3) controls mux 810 such that the L value from register 812 is always selected if the data is only available in local memory, the S value from register 814 is always selected if the data is only available in system memory, and the L/S selection from path 808 is always selected if the data is mirrored. The state of the L/S selection signal can be changed as described above; thus, either local memory or system memory is dynamically selected.

It will be appreciated that the control and meter circuits described herein are illustrative and that further variations and modifications are possible. For example, one alternative embodiment of a meter circuit similar to that shown in FIG. 7 directly measures the latency of each request rather than inferring latency from the number of pending requests. In one such embodiment, the bus interface unit records a first timestamp representing the time when each request is transmitted on the bus and a second timestamp representing the time when the response is received at the bus interface unit. The difference between the two timestamps yields a latency value for the request. The latency value for each request can be provided to a meter circuit that computes an average latency and selects among the mirror locations based on the average latency value measured for one bus or based on a comparison between average latency values for both buses.

In some alternative embodiments, steering control circuit 314 selects among mirror locations using a combination of threshold comparisons and comparison of the activity levels on different buses. In one such embodiment, steering control circuit 314 compares the activity levels ($C_L$, $C_S$) of the local and system buses to each other and also compares each activity level to a threshold value ($T_L$, $T_S$) representing a saturation condition. The bus with the lower level of activity is selected unless that bus is saturated and the other bus is not, in which case the non-saturated bus is selected. For instance, if $C_L<C_S$, then the local bus would be selected as long as $C_L<T_L$; if $C_L>T_L$, then the system bus would be selected unless system bus is also saturated ($C_S>T_S$), in which case the local bus would be selected since it has the lower activity level. (As in other embodiments, the case where $C_L=T_L$ can be treated as $C_L>T_L$ or $C_L<T_L$, as desired.)

In another embodiment, steering control circuit 314 selects one of the buses except where using the other bus would increase the bandwidth. Such a rule can be useful, e.g., where one of the buses (e.g., the local bus) has lower latency and is therefore preferable whenever bandwidth is available. In one implementation, steering control circuit 314 first compares the activity level of the local bus ($C_L$) to a saturation threshold ($T_L$); as long as $C_L<T_L$, the local bus is selected. If $C_L>T_L$, then the activity level $C_L$ is compared to the level of activity on the system bus ($C_S$) and, if $C_L>C_S$, the system bus is selected; otherwise, the local bus is selected. (As in other embodiments, the case where $C_L=T_L$ can be treated as $C_L>T_L$ or $C_L<T_L$, as desired.)

In other embodiments, steering control circuit 314 may also select among mirror locations based on factors other than the measured bus or device activity levels. For example, comparison circuit 506 (FIG. 5) or comparison circuit 806 (FIG. 8) may limit the frequency with which the L/S selection signal can change from one state to another. In one embodiment, after the L/S selection signal changes state, the comparison circuit waits a minimum number of clock cycles (based on the memory interface clock) before performing further comparisons and/or changing the state of the signal. Thus, selection of a mirror location can be history-dependent.

A limit on bus-switching frequency can be particularly useful in embodiments where some or all of the cores generate streams of requests with significant page locality. As is known in the art, in many existing memory devices (e.g., DRAM), consecutive accesses to different locations in the same memory page are generally faster than accesses to locations in different pages. If a core is generating a stream of page-local requests for non-mirrored data, limiting the bus-switching frequency can reduce the number of new page accesses and improve memory response times. Similarly, if a core is generating a stream of page-local requests for mirrored data, it may be desirable to send groups of such requests to the same device rather than splitting them up.

In other embodiments, selection of a mirror location might also be based at least in part on characteristics of the request. As is known in the art, different types of read operations may be more efficiently handled by different types of memory devices. For instance, a "read/modify/write" request is most efficiently handled using a device with an access path that is capable of hiding at least some of the latency; in some embodiments, the local memory device provides better latency hiding and may be selected even if the local bus is more heavily loaded than the system bus. As another example, one memory device in a system might handle large aligned burst-mode requests more efficiently than another device, and such requests could preferentially be directed to the device that can handle them most efficiently while smaller and/or unaligned requests are directed to the other device. Similarly, random accesses can be preferentially directed to the device best suited for handling them.

It will be appreciated that a steering control circuit can also select a mirror location based on a combination of performance criteria including but not limited to bus activity level, history, characteristics of the request and the candidate memory devices, and/or any other information that can be made available to the steering control circuit at the time a request is processed.

In some embodiments, the steering control circuit may include logic circuitry implementing multiple operating modes for selecting a mirror location, including, e.g., a "threshold" mode that compares a bus to a threshold, a "metered" mode that compares activity levels on two buses, and/or a "hybrid" mode that uses a combination of threshold and bus-to-bus comparisons. In addition, a steering control circuit may also include logic circuitry implementing multiple alternative measurements of bus activity (e.g., latency and amount of data being transferred). Operating modes and measurements to be used while executing a given application may be selected by an application developer via appropriate configuration parameters supported by the graphics driver API; some embodiments may also include a user interface for selecting the desired operating mode of the steering control circuit.

While the invention has been described with respect to specific embodiments, one skilled in the art will recognize that numerous modifications are possible. For instance, while the embodiments described above include just two mirrored locations, a larger number of mirror locations may be employed, with mirrored data being stored in any two or more of the locations. The state information bundle for each data block can be modified to indicate in which one or more of the possible locations that data block is stored, and the steering control logic can be modified to select among more than two candidate locations for a given request using techniques similar to those described above.

The physical pathway connecting a memory interface to a mirror location, referred to herein as a "bus," may be of any design and may conform to any data transfer protocol. A "bus" connection between the memory interface and the mirror location may include multiple segments conforming to the same protocol or different protocols, and the segments can be interconnected by bridges or other suitable components. Further, two or more of the mirror locations might be in different devices that coupled to the graphics processor via the same path or partially overlapping paths. Such an arrangement might be helpful, e.g., where the I/O bandwidth of particular devices, rather than bus bandwidth, is a limiting factor in data throughput. In such embodiments, the meter circuit is advantageously configured to monitor the load on each device rather than aggregate bus activity.

It is also to be understood that mirroring is not limited to texture surfaces or other surfaces Any data block can be mirrored to any location and to any number of locations, with one of the mirror locations being selected dynamically in response to data requests; e.g., in the manner described above. Such a data block might include all or part of a surface, or any other data, such as vertex lists (including attributes), commands for the graphics processor, and so on. In some embodiments, one portion of a data block is mirrored while another portion is not mirrored; the processor selects a mirror location based at least in part on whether the requested data is in the mirrored portion or the non-mirrored portion of the data block.

Mirroring is most advantageously used for data that is not frequently updated. If mirrored data is updated, all copies should be updated at approximately the same time to maintain coherence among the mirror locations. Such updates generally entail communicating with each mirror location via the appropriate bus and thus add to bus traffic. However, it is to be understood that data subject to modification (by the graphics processor and/or CPU) can be mirrored if desired. In one embodiment, when the memory interface of the graphics processor processes a write request for a mirrored data block, corresponding write requests are sent in parallel to each mirror location.

Further, mirroring as described herein is not limited to graphics processors. Any processor capable of accessing two or more different data storage locations (e.g., memories) can use the techniques described herein to mirror data to multiple locations and to determine dynamically which mirror location to access at the time access is requested. It should also be noted that any addressable storage location may be substituted for the memory devices described herein.

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. In a memory interface unit of a processor, a method of reading data, the method comprising:
   receiving an instruction to read data, wherein a copy of the data is stored in each of a plurality of mirror locations, each of the mirror locations being communicably coupled to the processor;
   selecting, in response to receiving the instruction, a source location to be used for reading the data, the source location being one of the plurality of mirror locations; and
   requesting the data from the source location,
   wherein a first one of the plurality of mirror locations is in a first memory device, the method further comprising:
   determining a first level of activity for the first memory device,
   wherein the source location is selected based at least in part on the first level of activity.

2. The method of claim 1 wherein the act of selecting the source location includes selecting among the plurality of mirror locations based at least in part on a performance criterion.

3. The method of claim 1 wherein the first memory device is coupled to the memory interface unit by a first bus and wherein the act of determining the first level of activity includes determining an amount of data requested via the first bus during a time interval.

4. The method of claim 1 wherein the act of determining the first level of activity includes determining a number of pending requests for the first memory device, wherein each pending request is a request that has been transmitted to the first memory device by the memory interface unit and for which the memory interface unit has not received a response from the first memory device.

5. The method of claim 1 wherein the act of determining the first level of activity includes determining an average latency for receiving a response from the first memory device to a request transmitted by the memory interface unit.

6. The method of claim 1 wherein the act of selecting the source one of the memory locations includes:
   comparing the first level of activity to a threshold;
   selecting the first mirror location as the source location in the event that the first level of activity is below the threshold; and
   selecting one of the mirror locations other than the first mirror location as the source location in the event that the first level of activity is above the threshold.

7. In a memory interface unit of a processor, a method of reading data, the method comprising:
   receiving an instruction to read data, wherein a copy of the data is stored in each of a plurality of mirror locations, each of the mirror locations being communicably coupled to the processor;
   selecting, in response to receiving the instruction, a source location to be used for reading the data, the source location being one of the plurality of mirror locations; and
   requesting the data from the source location,
   wherein a first one of the plurality of mirror locations is in a first memory device and a second one of the plurality of mirror locations is in a second memory device, the method further comprising:

determining a first level of activity for the first memory device, determining a second level of activity for the second memory device, wherein the source location is selected based at least in part on comparing the first level of activity and the second level of activity.

8. The method of claim 7 wherein the first mirror location is selected as the source location in the event that the first level of activity is lower than the second level of activity and the second mirror location is selected as the source location in the event that the second level of activity is lower than the first level of activity.

9. The method of claim 7 wherein:

the first mirror location is selected as the source location in the event that the first level of activity is lower than the second level of activity and the first level of activity is also below a threshold level; and the second mirror location is selected as the source location in the event that the second level of activity is lower than the first level of activity or the first level of activity is above the threshold level.

10. A memory interface unit for accessing data, wherein at least some of the data is mirrored at two or more of a plurality of mirror locations, the memory interface unit comprising:

a client interface section configured to receive an instruction to read data;

a steering section configured to determine, in response to the instruction, whether the data to be read is mirrored and, in the event that the data to be read is mirrored, to select one of the mirror locations at which the data is mirrored as a source location to be used for reading the data, and a bus interface section configured to send a request for the data to the source location, wherein a first one of the plurality of mirror locations is in a first memory device and a second one of the plurality of mirror locations is in a second memory device, and wherein the bus interface section includes:

a first bus interface unit configured to communicate with the first memory device via a first bus; and a second bus interface unit configured to communicate with the second memory device via a second bus, wherein the steering section includes:

a meter circuit configured to measure a level of activity on the first bus; and a control circuit configured to select one of the first mirror location and the second mirror location as the source location, based on the measured level of activity, wherein the meter circuit includes a counter configured to count, during an interval consisting of a number NSR of clock cycles, a number C of the clock cycles occupied by the data associated with each request sent on the first bus, wherein the meter circuit further includes:

a shift register having a number NSR of nodes including an input node and an output node; and a serializer coupled to the input node of the shift register and configured to load a logic high value into the shift register corresponding to each clock cycle occupied by the data associated with each request sent on the first bus and to load a logic low value into the shift register corresponding to each clock cycle not occupied by the data associated with each request sent on the first bus, the serializer being further configured to increment the counter each time a logic high value is loaded into the shift register, wherein the shift register is configured to decrement the counter each time a logic high value arrives at the output node of the shift register.

11. The memory interface unit of claim 10 wherein the steering section is further configured such that selection of the source location is based at least in part on a performance criterion.

12. The memory interface unit of claim 10 wherein the steering section is further configured such that selection of the source location is based at least in part on an activity level associated with one of the mirror locations.

13. The memory interface unit of claim 10 wherein the control circuit includes:

a comparison circuit configured to compare the measured level of activity to a threshold, wherein the control circuit is further configured to select the first mirror location as the source location in the event that the measured level of activity is below the threshold and to select the second mirror location as the source location in the event that the measured level of activity is above the threshold.

14. The memory interface unit of claim 10 wherein the first bus is a local bus and the second bus is a shared system bus.

* * * * *